United States Patent

Kubota et al.

[15] 3,651,255

[45] Mar. 21, 1972

[54] AUTOMATIC GAIN CONTROL SYSTEM FOR TELEVISION CAMERAS

[72] Inventors: Yasuharu Kubota, Kanagawa-ken; Takashi Shiono, Tokyo, both of Japan

[73] Assignee: Sony Corporation, Tokyo, Japan

[22] Filed: Feb. 17, 1970

[21] Appl. No.: 12,069

[30] Foreign Application Priority Data

Feb. 22, 1969 Japan....................................44/13410

[52] U.S. Cl.........................178/7.2 R, 178/DIG. 26, 330/29, 330/141

[51] Int. Cl..........................................................H04n 5/19

[58] Field of Search................178/DIG. 26, 7.3 DC, 7.5 DC, 178/7.2 R; 330/29, 138, 141

[56] References Cited

UNITED STATES PATENTS

| | | | |
|---|---|---|---|
| 2,835,795 | 5/1958 | Kroger | 330/141 |
| 3,441,866 | 4/1969 | Barber et al. | 330/29 |
| 3,102,163 | 8/1963 | Sennhenn | 178/7.1 |
| 3,435,252 | 3/1969 | Eubanks | 178/7.1 |

*Primary Examiner*—Richard Murray
*Assistant Examiner*—P. M. Pecori
*Attorney*—Lewis H. Eslinger, Alvin Sinderbrand and Curtis, Morris & Safford

[57] ABSTRACT

An automatic gain control system for television camera which has an amplifier circuit and a memory circuit for selecting the gain of the amplifier in response to a signal applied thereto. The memory circuit stores the signal selectively applied thereto with a manual switch.

4 Claims, 1 Drawing Figure

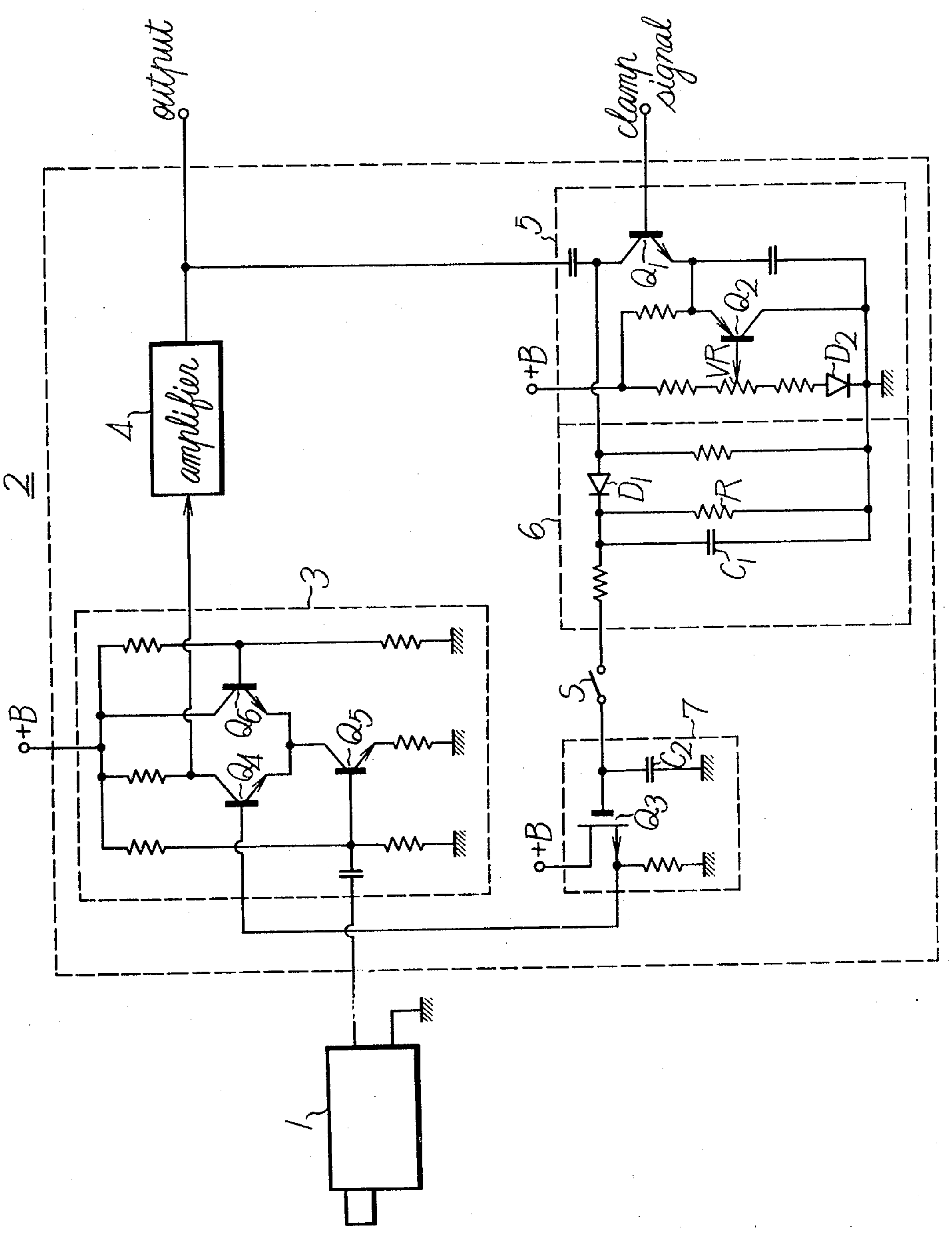
INVENTOR.
Yasuharu Kubota
Takashi Shiono
ATTORNEYS
BY

AUTOMATIC GAIN CONTROL SYSTEM FOR TELEVISION CAMERAS

BACKGROUND OF THE INVENTION

1. Field of the Invention

This invention relates to an automatic gain control system for television cameras, and more particularly to an automatic gain control system for television cameras which is designed to detect an optimum value of the transfer characteristics of a video amplifier and maintain it for a time required.

2. Description of the Prior Art

Generally, television cameras employ an automatic gain control circuit by means of which the level of an output video signal is controlled to be substantially constant. In this case the automatic gain control circuit is controlled to hold constant the mean value of the level of brightness of an object being televised at all times. Consequently, this encounters a defect such that when the object being televised is locally irradiated by relatively intense rays of light the mean level of the control signal also varies with the level of the light to darken the reproduced picture in its entirely. Further, there is another dis-advantage such that when the object becomes gradually darker or brighter and especially such gradual change of the brightness of the object is desired to be emphasized, the difference of the brightness is automatically corrected by the automatic gain control circuit to reproduce the image of the object as if picked up under constant brightness.

Such drawbacks can be avoided by manual adjustment of the gain without the provision of the automatic gain control circuit but this requires gain adjustment for each object to be televised and its adjustment operation is troublesome.

SUMMARY OF THE INVENTION

The system of this invention has a gain control circuit and a memory circuit for selecting the gain or attenuation degree of the gain control circuit. Accordingly, the gain or transfer characteristics of the gain control circuit remains constant unless the output voltage of the memory circuit is altered. Further, the output voltage of the memory circuit can be changed by the operation of a manual switch proportionately to its input video signal in response to the brightness of the object to be televised. Consequently, the gain of the gain control circuit is selected by operating the manual switch, when required, to be optimum to the object being televised and is maintained by the memory circuit for a desired period of time.

Accordingly, the present invention has for its object the provision of an automatic gain control system which is free from the drawbacks encountered in the conventional automatic gain control circuit and has advantages of the conventional automatic gain control circuit and the manual gain control.

Other objects, features and advantages of this invention will become apparent from the following description taken in conjunction with the accompanying drawings.

BRIEF DESCRIPTION OF THE DRAWING

The accompanying sheet of a drawing schematically one embodiment of this invention.

DESCRIPTION OF THE PREFERRED EMBODIMENTS

In the drawing reference numeral 1 indicates generally a television camera and 2 an automatic gain control circuit of this invention in which a video signal derived from the television camera 1 is applied to a gain control circuit 2 and is amplified by an amplifier to be of a predetermined amplitude, thereafter being fed to an output terminal. The output signal of the amplifier 4 is supplied to a rectifier circuit 6 through a clamp circuit 5, which is provided for eliminating changes in the video signal level due to a dark current in the television camera 1. For example, the base of a transistor $Q_1$, is supplied with a clamp signal synchronized with a horizontal synchronizing signal and a DC voltage of a predetermined level is supplied to a field effect transistor $Q_3$ (hereinafter referred to as a FET) by a regulator made up of a transistor $Q_2$, so that the output of the amplifier 4 is clamped by the transistor $Q_3$ at a constant level. A volume VR is provided for adjustment of the clamp level and a diode $D_2$ is for temperature compensation.

The rectifier circuit 6 has a diode $D_1$ and a time constant circuit consisting of a resistor R and a capacitor $C_1$ and rectifies the clamped output of the clamp circuit 5. The rectified output of the rectifier circuit 6 is applied to a memory circuit 7, if necessary through a normally open manual switch S. The memory circuit 7 may be made up of, for example, a memory capacitor $C_2$ and the field effect transistor $Q_3$.

The FET $Q_3$ is used in the form of a source-follower type one and has the capacitor $C_2$ connected between its gate and ground, so that the gate input impedance of the FET $Q_3$ is held approximately $10^{10}$ ohms. Accordingly, when the capacitor $C_2$ is charged through the manual switch S the charge stored is maintained for many hours to memorize its level. The source of the FET $Q_3$ produces an output voltage corresponding to the charge stored by the capacitor $C_2$ and the resulting output voltage is supplied as a control signal to the gain control circuit 3. The gain control circuit 3 takes the form of a differential amplifier consisting of transistors $Q_4$, $Q_5$ and $Q_6$, in which the base of the transistor $Q_4$ is connected to the memory circuit 7, as illustrated.

With the above arrangement, when reflected light from the object being televised is received by the television camera 1 to derive therefrom a video signal, the rectifier circuit 6 produces a rectified output of the video signal corresponding to the amount of light reflected from the object. Accordingly, charge is supplied by closing the manual switch S from the rectifier circuit 6 to the memory capacitor $C_2$ to memorize the level of the charge. Thus, the source of the FET $Q_3$ is held at a voltage level corresponding to the level memorized by the memory capacitor $C_2$, so that the base of the transistor $Q_4$ provided in the gain control circuit 3 is biased at the voltage level to achieve variable control of the amplification degree of the gain control circuit 3. As a result of this, the level of the video signal transmitted through the video signal transmission system can be corrected to be an appropriate value.

In the event that the amount of light reflected from the object increases, the level of the video signal derived from the television camera 1 also rises, thereby the raise the level of the rectified output of the rectifier circuit 6. When adjustment is required the switch S is once closed, by which the level memorized by the memory capacitor $C_2$ is altered from its previous charged level to a level corresponding to the video signal level of the object being televised, thereby restoring the brightness of the reproduced picture to an appropriate value.

In accordance with the present invention appropriate gain control is achieved by a mere closing operation of the switch S, by which the brightness of the object being televised is detected and the video signal level is immediately corrected to an appropriate level as above described. Further, even if the switch S is always open after the video signal level has once been corrected to the appropriate level, the level is memorized and maintained by the memory circuit 7 to hold the amplification degree of the automatic gain control circuit 2 constant. Consequently, even if the television camera 1 is irradiated by relatively intense light reflected from one portion of the object, the amplification degree of the gain control circuit 3 is held constant to ensure that the brightness of the overall reproduced picture remains unchanged.

When televising objects of remarkedly different brightness, one closing operation of the switch S is sufficient for each object at the start of the televising operation and, thereafter a constant gain is maintained irrespective of variations in the brightness of the object and gain control can be effected only by operating the switch when required.

In the foregoing the switch S is designed to be held in the on state for a short time but it may be adapted to be in the on state for a longer time, if necessary.

In the automatic gain control circuit the gain control circuit has been described to be of the type that its amplification degree is variably controlled but it may be of other type that, for example, the attenuation degree is variably controlled. Further, it will also be seen that the memory circuit may be of other connections.

It will be apparent that many modifications and variations may be effected without departing from the scope of the novel concepts of this invention.

We claim as our invention:

1. An automatic gain control system for television cameras comprising a gain control circuit of variable gain, means for applying a television camera signal as the input to said gain control circuit, means for producing a control signal in proportion to the level of said television camera signal, a memory circuit for controlling said gain control circuit, and manually actuable switch means for selectively applying the control signal to said memory circuit, said memory circuit storing the control signal applied thereto in response to actuation of said switch means for maintaining the gain of the gain control circuit constant at a corresponding level until said switch means is again manually actuated for applying a new control signal to said memory circuit.

2. An automatic gain control system for television cameras as claimed in claim 1 wherein said memory circuit includes a field effect transistor and a capacitor connected to the gate of said transistor and on which said control signal is stored.

3. An automatic gain control system for television cameras as claimed in claim 2 wherein said field effect transistor is of the source follower connection type and supplies its source voltage to said gain control circuit for controlling the gain of the latter.

4. An automatic gain control system for television cameras as claimed in claim 3 wherein said means for producing the control signal consists of a clamp circuit and a rectifier circuit.

* * * * *